R. L. PURCELL & G. E. PARKHILL.
NUT LOCK.
APPLICATION FILED APR. 10, 1915.
1,208,210.
Patented Dec. 12, 1916.
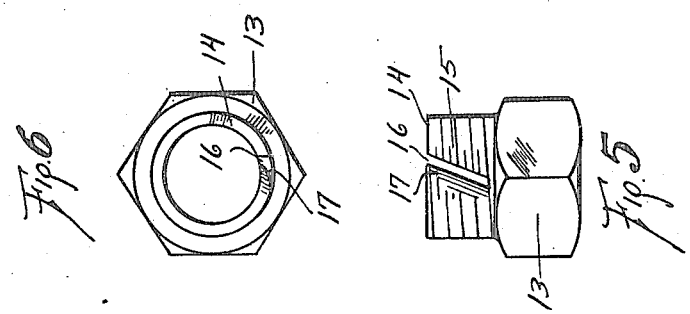
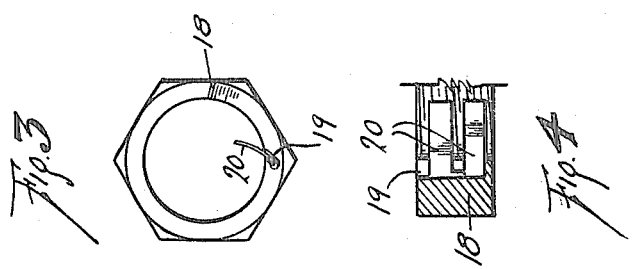
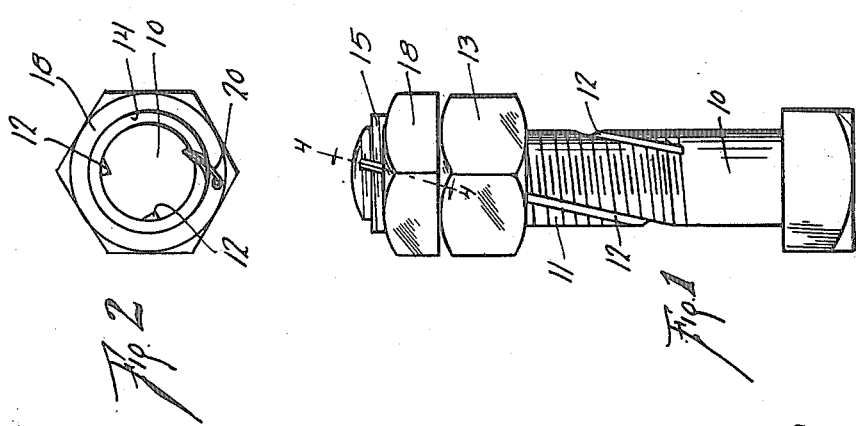
Witnesses
Inventors
Richard L. Purcell
and
George E. Parkhill
By L. L. Westfall
Attorney

UNITED STATES PATENT OFFICE.

RICHARD L. PURCELL AND GEORGE E. PARKHILL, OF SPOKANE, WASHINGTON.

NUT-LOCK.

1,208,210.  Specification of Letters Patent.  Patented Dec. 12, 1916.

Application filed April 10, 1915. Serial No. 20,508.

*To all whom it may concern:*

Be it known that we, RICHARD L. PURCELL and GEORGE E. PARKHILL, citizens of the United States of America, residing at Spokane, in the county of Spokane and State of Washington, have invented certain new and useful Improvements in Nut-Locks, of which the following is a specification.

This invention pertains to lock-nuts and has for its object to provide means for locking a nut on a bolt in such a manner that the nut can turn neither way on the bolt to tighten or loosen the same while locked in the manner hereinafter described.

The particular construction and operation of parts will be hereinafter described and illustrated in the accompanying drawings, in which—

Figure 1, is an assembled view of the bolt, nut and locking parts, Fig. 2, is a plan view of the same, Fig. 3, is a plan view of the locking nut entering into the construction, Fig. 4, is a broken-away sectional view taken on the line 4—4 of Fig. 1, Fig. 5, is a side elevation of the specially constructed nut entering into the construction, and Fig. 6, is an end view of the same.

In a detail description in which like numerals refer to like parts throughout the several views, a bolt 10 is shown provided with the usual screw threads 11 having spirally arranged grooves 12 formed therein. A nut 13 provided with the usual screw threaded bore for engaging the threads of the bolt is provided, with a tubular extension 14 having on its outer surface screw threads 15, but through the extension 14 is a diagonal groove 16 of the same angle as the grooves 12 in the bolt 10. A beveled surface 17 is provided for the wall of the extension 15 on one side of the groove 16. A lock nut 18 is provided with the usual screw threaded bore for engaging the threads 15 on the extension 14 of the nut
13. In the wall of the lock nut 18 is a slot
19 in which is secured one or more spring pawls 20.

In the practical application of the device, the lock nut 18 is turned onto the screw threaded extension 14 of the nut 13 with the spring pawls 20 resting on the beveled wall 17. The nut 13 is then turned onto the threads 11 of the bolt 10 to the desired position, then the lock nut 18 is turned backward a short distance to thrust the spring pawls 20 through the groove 16 into one of the spiral grooves 12 and the nut 13 turned slightly to bind the pawls 21 between the extensions 14 and the bolt 10 and into the groove 12. This securely locks the nut 13 as against turning on the bolt 10 in either direction. When it is desired to remove the nut 13 from the bolt 10, the nut 13 is turned slightly to release the pawls 20 from their binding engagement in the groove 12, then the lock nut 18 is turned slightly to bring the pawls 20 back onto the beveled surface 17 when the nut 13 may be removed.

What is claimed is,

The combination with a screw threaded bolt having grooves traversing its threads, of a nut with a tubular extension having a screw thread on its outer surface and a longitudinal slot therein and a beveled wall on one side of the slot and a lock nut having a threaded bore to engage the threads on said extension and inwardly extending spring pawls adapted to extend over the beveled wall and through the slot in said extension and into one of the grooves traversing the threads of the bolt.

In testimony whereof we affix our signatures in presence of two witnesses.

RICHARD L. PURCELL.
GEORGE E. PARKHILL.

Witnesses:
L. L. WESTFALL,
WILLIAM H. KAYE.

Copies of this patent may be obtained for five cents each, by addressing the "Commissioner of Patents, Washington, D. C."